Feb. 2, 1937.  A. M. SCHROEDER  2,069,684
GROWTH EXTERMINATOR
Filed May 25, 1936
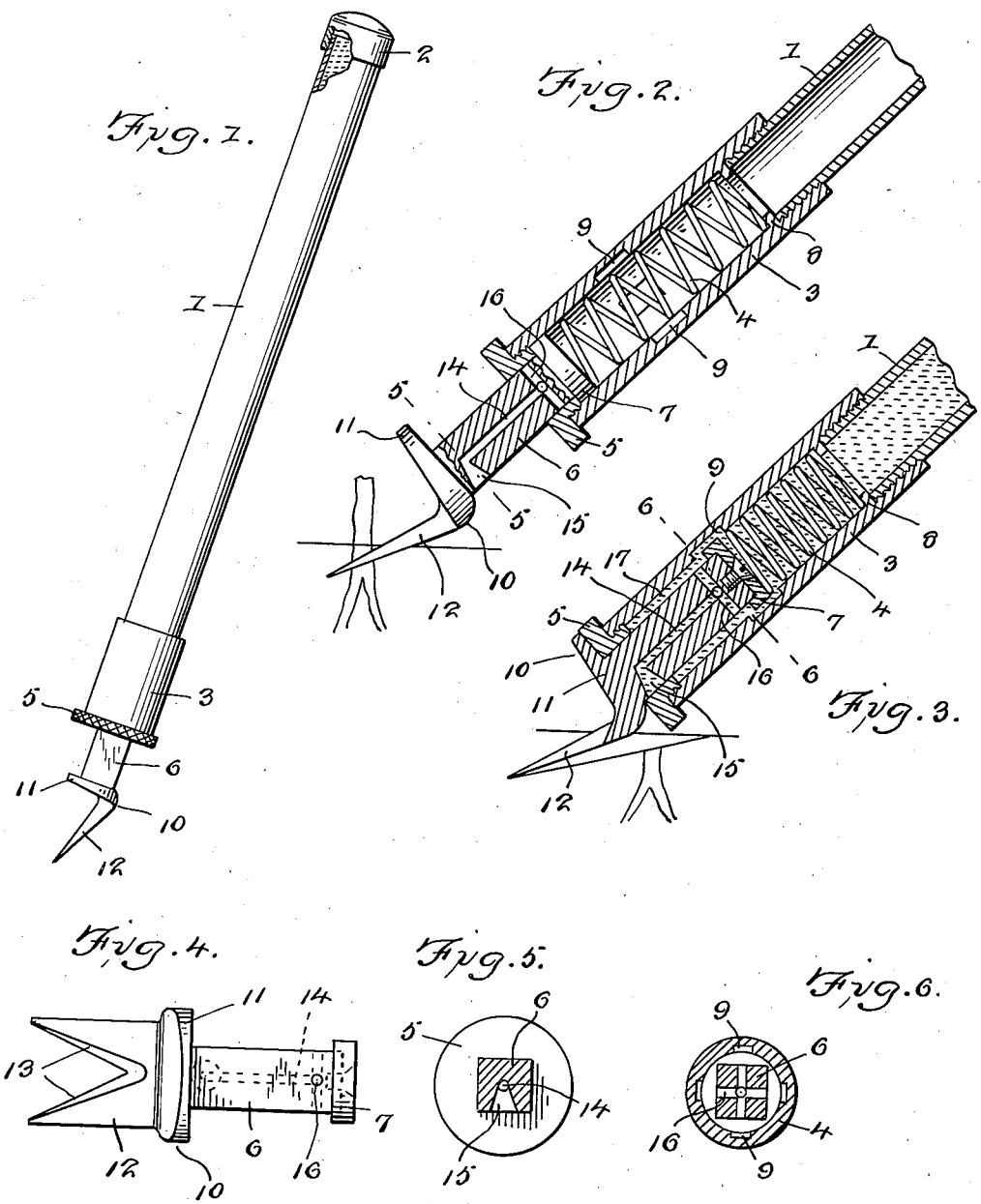
A. M. Schroeder
INVENTOR
BY Victor J. Evans & Co.
ATTORNEY Patented Feb. 2, 1937

2,069,684

UNITED STATES PATENT OFFICE 2,069,684

GROWTH EXTERMINATOR

August M. Schroeder, Peotone, Ill.

Application May 25, 1936, Serial No. 81,735

3 Claims. (Cl. 47—49)

This invention relates to exterminators especially adapted for killing dandelions, weeds and other undesirable growths in lawns and has for the primary object the provision of a simple and inexpensive device of this character which may be easily handled and actuated to sever the undesirable growth and deliver onto the stems and roots thereof a predetermined amount of exterminating substance for killing the roots and thereby eliminate the undesirable growth so that grass will more readily grow.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation, partly in section, illustrating an exterminator constructed in accordance with my invention.

Figure 2 is a fragmentary vertical sectional view showing the exterminator positioned ready for severing undesirable growth.

Figure 3 is a view similar to Figure 2, showing the exterminator occupying a position after the severance of the growth.

Figure 4 is a top plan view showing the combined cutter and plunger.

Figure 5 is a sectional view taken on the line 5—5 in Figure 2.

Figure 6 is a sectional view taken on the line 6—6 of Figure 3.

Referring in detail to the drawing, the numeral 1 indicates a handle of hollow formation and of a suitable length and provides a reservoir for the accommodation of an exterminating liquid or substance. The handle at one end is closed by a removable cap 2 so that the exterminating liquid may be readily placed in the handle or the reservoir provided thereby. A sleeve 3 is detachably secured to the other end of the handle and forms a chamber for the accommodation of a coil spring 4. The chamber is in communication with the interior of the handle so that the exterminating liquid may readily pass therein. The free end of the sleeve has threaded thereto a bushing 5 which slidably supports a plunger 6 carrying at one end a head 7 operating in the sleeve 3. The head 7 is engaged by one end of the spring while the opposite end of the spring engages a seat 8 forming an integral part of the sleeve 3 and providing an abutment for the end of the handle 1 to engage. The plunger 6 is of rectangular shape in cross section and the opening in the bushing 5 is correspondingly shaped while the head 7 is shaped to match the walls of the sleeve 3. Bypass grooves 9 are formed in the walls of the sleeve 3.

The free end of the plunger 6 has formed thereon a combined guard and cutter 10. Said combined guard and cutter includes a plate-like portion 11 acting as a guard and fork-shaped prongs 12 providing the cutter. The opposing edges of the prongs 12 converge and are sharpened or beveled, as shown at 13. The guard 11 extends at right angles to the cutter 12. The guard 11 limits the inward movement of the plunger 6 in the sleeve 3. The plunger 6 is provided with a passage 14 having an outlet 15 located adjacent the guard 11 where the latter forms onto the cutter 12. The passage 14 communicates with a series of passages 16 opening outwardly through the faces of the plunger. The angularly related faces of the plunger cooperates with the walls of the sleeve in forming a measuring chamber 17, the passages 16 being in continuous communication therewith. The head 7 is removable from the plunger 6 and acts as a valve element between the handle and the measuring chamber 17 and in order that the handle be in communication with the measuring chamber 17 the plunger must be moved inwardly to its fullest extent bringing the head 7 opposite the bypasses 9, then the exterminating liquid will pass into the measuring chamber 17 for filling the latter. The plunger when in said position has the outlet 15 thereof closed by lying within the bushing 5 preventing the escape of exterminating liquid from the measuring chamber and the passages associated therewith.

Normally the spring 4 positions the plunger 6 outwardly so that the head 7 engages the bushing 5, as shown in Figure 2. In operation, the cutter 12 is brought into engagement with the growth, as shown in Figure 2. A pressure is placed on the handle, moving the plunger inwardly of the sleeve until the guard 11 abuts the bushing 5. The measuring chamber 17 is then in communication with the reservoir of the handle receiving a predetermined amount of exterminating substance from the reservoir. A further pressure is placed on the handle to bring about the severance of the growth, as shown in Figure 3. The pressure is slightly released on the handle to permit the spring 4 to move the handle upwardly bringing the plunger 6 into its outermost position so as to allow the exterminating substance in the measuring chamber to flow onto the roots of the growth after the severance thereof. It is to be noted that during the severance of the growth, as shown in Figure 3, the outlet 15 of the passage 14 is closed, consequently preventing the exterminating substance from flowing outwardly from the measuring chamber.

Having described the invention, I claim:

1. A growth exterminator comprising a handle forming a reservoir for an exterminating substance, a sleeve secured to said handle and in communication therewith, a valve type plunger slidable in said sleeve and cooperating therewith in forming a measuring chamber which when in one position is in communication with the handle and when in another position is closed to said handle, said valve type plunger having an outlet communicating with the measuring chamber and opening outwardly through one side thereof to permit the measuring chamber to empty when in one of its positions and to prevent emptying of the measuring chamber when in its other position, and a cutter carried by said plunger-like valve.

2. A growth exterminator comprising a handle forming a reservoir for an exterminating substance, a sleeve secured to said handle and in communication therewith, a valve type plunger slidable in said sleeve and cooperating therewith in forming a measuring chamber which when in one position is in communication with the handle and when in another position is closed to said handle, said valve type plunger having an outlet communicating with the measuring chamber and opening outwardly through one side thereof to permit the measuring chamber to empty when in one of its positions and to prevent emptying of the measuring chamber when in its other position, a spring acting on the plunger like valve to position the same for closing the measuring chamber to the handle, and a cutter carried by said plunger like valve.

3. A growth exterminator comprising a handle forming a reservoir for an exterminating substance, a sleeve secured to said handle and in communication therewith, a valve type plunger slidable in said sleeve and cooperating therewith in forming a measuring chamber which when in one position is in communication with the handle and when in another position is closed to said handle, said valve type plunger having an outlet communicating with the measuring chamber and opening outwardly through one side thereof to permit the measuring chamber to empty when in one of its positions and to prevent emptying of the measuring chamber when in its other position, a spring acting on the plunger like valve to position the same for closing the measuring chamber to the handle, and a combined guard and cutter formed on said plunger like valve and including a plate-like portion to provide a guard and tapering prongs integral therewith and extending at substantially right angles thereto and having opposing edges converging and sharpened.

AUGUST M. SCHROEDER.